United States Patent [19]
Reszler

[11] Patent Number: 5,974,167
[45] Date of Patent: Oct. 26, 1999

[54] SYSTEM AND METHOD FOR MEASURING AND CONTROLLING THE QUALITY OF DISPERSION OF FILLER PARTICLES IN RUBBER COMPOUNDS

[75] Inventor: James M. Reszler, Chagrin Falls, Ohio

[73] Assignee: M.A.HannaRubberCompounding, Chagrin Falls, Ohio

[21] Appl. No.: 08/887,913

[22] Filed: Jun. 30, 1997

[51] Int. Cl.$^6$ ........................................................ G06K 9/00
[52] U.S. Cl. ............................................................. 382/141
[58] Field of Search .................................... 382/133, 100, 382/141, 143, 169, 168, 180, 190, 254; 250/234, 560, 563, 572, 223; 235/92; 356/124–127, 237, 239, 240

[56] References Cited

U.S. PATENT DOCUMENTS

| | | | |
|---|---|---|---|
| 3,461,280 | 8/1969 | Vitt et al. ................................... | 235/92 |
| 3,805,028 | 4/1974 | Morton ....................................... | 382/133 |
| 3,818,223 | 6/1974 | Gibson et al. .......................... | 250/223 R |
| 4,700,078 | 10/1987 | Mizuno et al. ........................... | 219/214 |
| 5,149,978 | 9/1992 | Opsal et al. .............................. | 250/234 |
| 5,359,906 | 11/1994 | Kanai ...................................... | 364/555 |
| 5,625,705 | 4/1997 | Recht ..................................... | 382/133 |

OTHER PUBLICATIONS

Herzig, R. & Baker, W.E. Correlations between image-analysed morphology and mechanical properties of calcium carbonate–filled polypropylene. *J. Materials Science* 18: 6531–6539 (1993).

Yeh Wang et al., Single screw extrusion compounding of particulate filled thermoplastics: State of dispersion and its finfluence on impact properties. *J. Applied Polymer Science* 60 (No. 11): 1779–1791, Jun. 13, 1996.

Karasek, L. et al., Characterization of dispersion state of filler and polymer–filler interactions in rubber–carbon black composites. J. Materials Science 31 (No. 2): 281–289, Jan. 15, 1996.

Advertisement by M.A. Hanna Company appeared in *Rubber and Plastics News* on May 6, 1996.

Chung, Bin; Menashi, Jameel; Mackay, Bruce E.; and Curtis, Daniel J. of Cabot Corp. The Influence Of Carbon Black Morphology And Pellet Properties On Macro–Dispersion. Rubber World, Jun. 1997.

KS—Kontrol Imaging Systems. Brochure distributed by Kontrol Elektronik.

Advertisement by Zeiss Optical Systems, Inc.

Hess, W.M., Characterization of Dispersions. Rubber Chemistry and Technology, vol. 64: pp. 386–449.

Coran, A.Y. and J.B. Donnet. The Dispersion of Carbon Black in Rubber Part I. Rapid Method for Assessing Quality of Dispersion. Rubber Chemistry and Technology, vol. 65: 973–996, 1992.

Coran, A.Y. and J.B. Donnet. The Dispersion of Carbon Black in Rubber Part II. The Kinetics of Dispersion in Natural Rubber. Rubber Chemistry and Technology, vol. 65: 998–1014, 1992.

(List continued on next page.)

*Primary Examiner*—Jose L. Couso
*Assistant Examiner*—Duy M. Dang
*Attorney, Agent, or Firm*—Jones, Day, Reavis & Pogue

[57] ABSTRACT

The invention provides methods and apparatus for quantitatively measuring and controlling the quality of the dispersion of filler particles in rubber compounds. A magnified image of a section of a freshly cut surface of a processed rubber sample is captured by the digital board of a computer image processing system. Processing of the image uses a series of groups of computer commands including commands for enhancing the image, distinguishing the filler particle entities from the polymer matrix, defining and labeling the particle entities and displaying the results of the analysis of the image.

17 Claims, 10 Drawing Sheets

OTHER PUBLICATIONS

Coran, A.Y. and J.B. Donnet. The Dispersion of Carbon Black in Rubber Part III. The Effect of Dispersion Quality on the Dynamic Mechanical Properties of Filled Natural Rubber. Rubber Chemistry and Technology, vol. 65, pp. 1016–1041.

Carbon Black Dispersion Analysis. Rubber Southern Africa, Sep. 1987, p 9.

Advertisement for Tangent Electroscanner (Testing Machines).

Lieberman, Alvin. Particle Sizing Data: How to Correlate Results of Different Measuring Instruments. Powder and Bulk Engineering, Feb. 1997, pp. 55–64.

Advertisement for Additives from A to Z (Harwick Chemical Corporation). Rubber Chemistry and Technology, vol. 65, 1992.

Richmond, Bruce R. Imaging System Improves Carbon Black View. Rubber & Plastics News, Mar. 14, 1994, pp. 27–30.

Product Information—DisperGrader.

Dispersion Rating By Image Analysis. Cabot Corporation Chemical Business Research & Development. Aug. 1994, pp. 1–30.

Evaluating Dispersion of Carbon Black in Rubber. Technical Report RG–124 Rivision #2. Cabot Corporation (date unknown).

Richmond, Bruce R. Carbon Black Dispersion Measurement. Part II. Influence of Dispersion on Physical Properties. Presented at a meeting of the Rubber Division, American Chemical Society, Oct. 26–29, 1993.

Guerbé, L. and P.K. Freakley. A Comparison of Some Indirect Methods of Measuring Carbon Black Dispersion in Rubber Compunds. International Technical Journal for Polymer Materials. vol. 48, pp. 260–269, 1995.

Stanley, James H. Computed Tomography. ASTM Standardization News, Jan. 1995, pp. 30–35.

Isenhour, Dwight L. Reference Radiological Images, Today and Tomorrow. ASTM Standardization News, Jan. 1995, pp. 50–53.

Vary, Alex. NDE of Ceramics and Ceramic Composites. ASTM Standardization News, Jan. 1995, pp. 40–49.

Funt, John M. Principles of Mixing and Measurement of Dispersion. Rubber World, Feb. 1986, pp.21–32.

Murray, G.A.W., D.W. Southwart, and P.K. Freakley. The Dark Field Cut Surface (DFCS) Test For Estimating the Dispersion of Carbon Black in Rubber Compounds. Rubber Chemistry and Technology, vol. 70, pp. 50–59.

Murray, G.A.W., B.H.R. Ng, M.R. Vaseghi Jahromi, and D.W. Southwart. Some Initial Trials and Applications of the DFCS Test for Carbon Black Dispersion. Rubber Chemistry and Technology, vol. 70, pp. 38–49.

Advertisement. Kontron KS Series Intuitive Image Analysis. (Carl Zeiss, Inc.).

SYSTEM AND METHOD FOR MEASURING AND CONTROLLING THE QUALITY OF DISPERSION OF FILLER PARTICLES IN RUBBER COMPOUNDS

BACKGROUND OF THE INVENTION

The quality of rubber and plastic products containing reinforcing pigments or fillers is highly dependent on the uniform dispersion of these materials throughout the polymer matrix. Dispersion occurs as particles of matter separate and become uniformly scattered throughout a medium. The dispersion of a filler in a polymer matrix can be defined by the distribution of the size of the filler entities and the distribution of the distance between the filler entities. The measurement of particle dispersion in polymers is important in order to avoid detrimental aspects of poor dispersion, such as reduced product life, poor performance during service, poor product appearance, poor processing characteristics and poor product uniformity. When a compound must be scrapped because of poor quality, there is also a combined waste of raw materials, energy used to mix the compound and production time, as well as the cost of waste disposal.

Carbon black is the primary reinforcing filler for rubber and provides such properties as improved strength, fatigue resistance, extensibility and abrasion resistance. To maximize the reinforcing effect, it is essential to establish good dispersion of the carbon black in the polymer matrix. Therefore, most of the reported methods for establishing the degree of filler dispersion in polymers have been described with respect to carbon black in rubber. However, other fillers may also be added to rubber, such as magnesium oxide, zinc oxide, titanium dioxide, silica, clay, talc, iron oxide, and the like.

The characteristic size ranges of the entities of reinforcing carbon black for rubber processing are pellets (millimeters), agglomerates (~10 microns), aggregates (~0.1 microns) and primary particles (~30 nanometers). Aggregates comprise a number of primary particles strongly fused together and are the basic unit of carbon black as it is formed in the furnace. Individual aggregates exhibit a natural cohesiveness for each other to form clusters (agglomerates) that can exist as hard lumps or packed dry powder that has not been wetted by the polymer. One objective of rubber processing is to overcome this cohesiveness and to disperse carbon black into rubber to as near the individual aggregate size as possible. Of the carbon black entities, it is large agglomerates that give rise to poor performance, such as tread wear resistance, higher hysteresis and earlier failure in dynamic applications. Large agglomerates are known to act as sites of flaw initiation and localized failure as the inherent flaw size for natural rubber is about 10 microns. Thus, dispersion is generally considered adequate when 95 percent of the agglomerates are below 10 microns in diameter.

Methods for assessing the quality of dispersion of fillers in rubber and other polymers have been investigated since about 1909, and include both direct and indirect methods to measure macrodispersion (particles greater than 10 microns) and/or microdispersion (particles less than 10 microns). Direct methods, such as visual surface inspection, optical microscopy, and surface roughness techniques measure macrodispersion; whereas microradiography, transmission electron microscopy and scanning electron microscopy measure microdispersion as well as macrodispersion. Sample preparation includes preparation of thin sections with a microtome using steel, glass or diamond knives; cryosections; cutting, tearing or stretching of samples; thinly extruding polymer tapes; and preparation of melted samples, such as thermoplastics, or of liquid dispersions, such as paints and inks, for examination on glass slides. Indirect methods that typically measure microdispersion include measuring the AC electrical conductivity or the microwave energy absorption of unvulcanized rubber samples, and dark field microscopic illumination to determine light scattering of the cut surface of a sample. Each of the above methods, however, is time-consuming and highly dependent on the quality of sample preparation. Moreover, optical methods are generally subjective because of a reliance on a comparison between the operator-observed dispersion and reference dispersion classification charts. Thus, these methods have only a poor to moderate accuracy. In addition, methods employing microradiography or electron microscopy are expensive.

With the recent availability of personal computers, video microscopes and computerized image analysis, several new methods for dispersion analysis have been reported. One method employs a surface finish measuring instrument, such as a stylus, to measure the peaks and valleys on the surface of a cut rubber sample. The roughness of the surface is then correlated to dispersion quality by a real-time computer software program. Although this method is fast, it measures only macrodispersion and does not provide an accurate measure of particle size and/or frequency because it does not distinguish agglomerates and aggregates from air spaces and sample cutting artifacts.

Recently reported optical methods of dispersion measurement employ a light microscope coupled with a digital imaging system. One such method is based on reflected light microscopy of the cut surface of a vulcanized rubber sample at a magnification of about 30× and comparison of the test sample with a reference sample when both are projected onto a split screen television monitor. The test sample is subjectively graded by the operator to the nearest reference sample and assigned a grade in a range from 1 (very bad dispersion) to 10 (absence of agglomerates that can be resolved at 30× magnification). This method is highly subjective and does not provide information on particle size or the distribution of differently sized particles.

Other optical methods for dispersion analysis employ imaging systems and computer software concepts similar to that used by the medical community to enhance computer assisted tomography (CAT) scan images and in tissue and blood-counting procedures. In one reported method, the rubber specimen is hardened with molten sulfur overnight and polished with metallic grinding agents to produce a mirror-like surface. The image of the surface is passed from a microscope to a photo multiplier and measurements are made of the light intensity reflecting off the specimen surface, with undispersed agglomerates having a higher reflectance than carbon black dispersed in the polymer matrix. The differences in optical density between the carbon-black agglomerates and the matrix are used to define the boundaries of the agglomerates and their size and spatial distribution, as measured by means of computer software pixel imaging analysis, and the percent carbon black dispersed on a volume basis calculated. This method is more accurate than subjective methods. However, the sample preparation requires a minimum of 16 hours due to the overnight treatment of the sample in molten sulfur. Therefore, this method has been recommended by its originators as a research and development tool, rather than to provide a more immediate dispersion analysis in the production environment.

Another method employs dark-field illumination coupled with a videomicroscope at a monitor magnification of 260× with field sizes of about one square millimeter and a computer image analysis software package. The data are processed on a spreadsheet, such as Quattro Pro. The method measures both macrodispersion and microdispersion with reasonable accuracy.

However, the method is highly dependent on the quality of the sample cut and the originators of this method also recommend that this method be used in a research setting.

Another method for measuring carbon black dispersion by computer imaging is currently used to grade carbon blacks according to their dispersability in a transparent polymer, such as ethylene vinyl acetate. By this method, particle dispersion in a transparent polymer tape is rated by an automated surface inspection technique that quantifies tape defects. The tape is driven by a spool system that produces enough tension on the tape to maintain a flat surface as the tape moves. A video camera constantly scans the tape and transmits the signal to a TV monitor and a computer image analysis system. The computer software corrects for die lines and scratches and selects and measures the defects by size. A plurality of tape images are then superimposed to form a compilation image of the defects and histograms of counts versus size and counts per unit area are produced. This method is also more accurate than subjective methods, but it requires that dispersion be measured in a transparent polymer, not in a rubber product.

In spite of the past and ongoing efforts to achieve a practical and accurate method for particle dispersion analysis, none of the reported methods provides a quantitative quality control test measurement for a product in a production setting.

There is a need, therefore, for a fast, non-subjective, inexpensive, accurate method for quantitatively measuring the dispersion of particles in a polymer, especially the dispersion of filler particles such as carbon black, in a processed rubber sample. Moreover, there is a need for a particle dispersion measurement method that can be used in the production environment to provide quality control of products and product uniformity from batch to batch.

SUMMARY OF THE INVENTION

The invention provides a method for quantitatively measuring filler dispersion in rubber that is fast, inexpensive, sensitive, accurate and provides reproducible results. The invention further provides a method for controlling the quality of dispersion of filler particles in rubber by modifying mixing parameters or the chemical composition of the rubber if the dispersion measurement falls outside of a predetermined allowable dispersion range. Each of these methods is usable as a quality control tool which allows a means by which to compare the quality of particle dispersion produced by different mixing procedures and to quantify the results of systematic improvements in mixing techniques. The method also allows production personnel to discern measurable changes in products when developing or making changes to manufacturing specifications. Moreover, the quantitative nature of the dispersion measurement allows the provision of valuable information to the consumer about critical variations in the filler dispersion in products received and gives the consumer the opportunity to make business and financial decisions regarding allowable degrees of dispersion in the final products.

In one embodiment of the invention, a method for measuring the dispersion of filler particles in rubber comprises the steps of cutting a processed rubber sample to provide a smooth flat surface comprising a polymer matrix and filler particle entities; lighting the surface to provide reflected light from a section of the surface; capturing a magnified image of the lighted section of the surface; transmitting the magnified image to a computer comprising software for image analysis; processing the magnified image using a series of computer commands including (i) a first group of commands that captures the image, (ii) a second group of commands that enhances the image, (iii) a third group of commands that distinguishes the filler particle entities from the polymer matrix, (iv) a fourth group of commands that defines each of the particle entities according to a computer-generated definition comprising pixels and grey scales and labels each of the particle entities falling within a minimum limit and a maximum limit for pixels and grey scales and, (v) a fifth group of commands that displays the computer-generated labels of the particle entities as a representation of the number of particle entities comprising each size of a plurality of particle entity sizes to provide a measurement of the dispersion of the filler particle entities in the rubber sample.

In another embodiment of the invention, a method for controlling the quality of dispersion of filler particles in rubber comprises the steps of mixing a filler with a polymer in a mixer having a selectable mixing parameter to obtain a processed rubber product having a chemical composition and comprising a dispersion of filler particles in a polymer matrix; obtaining a sample of the processed rubber product; cutting the rubber sample to provide a smooth flat surface; lighting the surface to provide reflected light from a section of the surface; providing a magnified image of the lighted section of the surface; transmitting the image to a computer comprising software for image analysis; processing the magnified image using a series of computer commands including (i) a first group of commands that captures the image, (ii) a second group of commands that enhances the image, (iii) a third group of commands that distinguishes filler particle entities from the polymer matrix, (iv) a fourth group of commands that defines each of the filler particles entities according to a computer-generated definition comprising pixels and grey scales and labels each of the particle entities falling within a minimum limit and a maximum limit for pixels and grey scales and, (v) a fifth group of commands that displays the computer-generated labels of the filler particle entities as a representation of the number of filler particle entities comprising each size of a plurality of filler particle sizes to provide a first dispersion measurement; providing a predetermined dispersion reference range for an allowable number of filler particles comprising each size of a plurality of allowable particle sizes; and comparing the first dispersion measurement with the reference dispersion range, wherein when the particle sizes or the particle numbers comprising the first dispersion measurement fall outside the dispersion reference range for the allowable particles numbers or the allowable particle sizes, the method further comprises the step of modifying a mixing parameter or the chemical composition of the rubber to provide a second processed rubber product having an allowable dispersion measurement.

The invention further provides an apparatus for cutting a sample of processed rubber to obtain a smooth flat surface for dispersion analysis and a computer macro for image analysis of the dispersion of filler particle entities in a rubber sample.

DETAILED DESCRIPTION OF THE INVENTION

Figure 1:
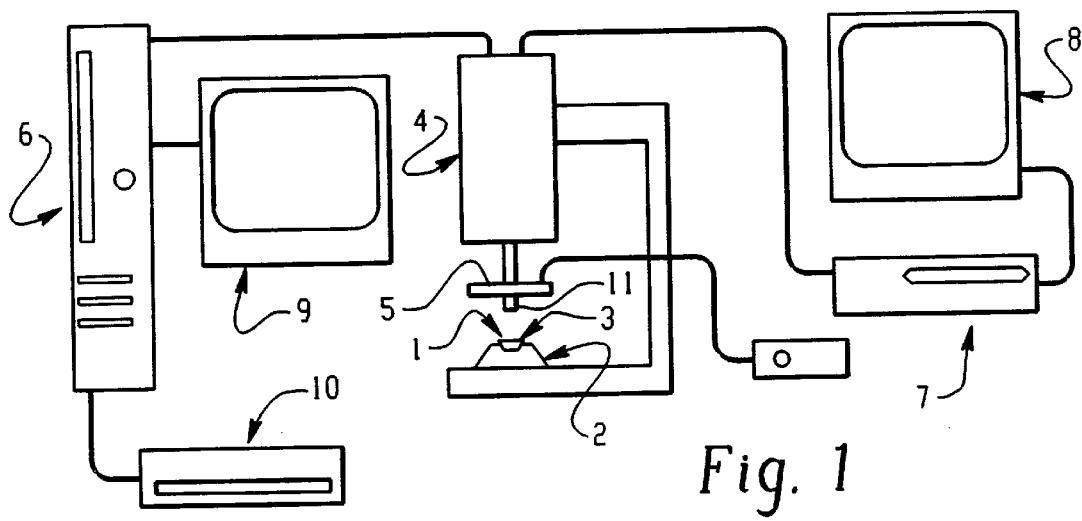
FIG. 1 is a schematic illustration of an embodiment of a configuration of equipment suitable for use in the methods of the invention for computer image analysis of particle dispersion in a rubber sample.

The invention provides methods and apparatus for measuring and controlling the quality of the dispersion of filler particles in rubber compounds. Filler particles in rubber that may be measured by the methods and apparatus of the invention include, but are not limited to, carbon black, magnesium oxide, zinc oxide, titanium dioxide, silicas, clay, talc, iron oxide, alumina trihydrate, silicons, ceramics, chalk, calcium sulfate, barium sulfate, calcium hydroxide, calcium carbonate, silicates, zinc sulfide, graphite, beryllium oxide, lead oxide, carbides, molybdenum sulfide, barium ferrite, zirconium silicate, aluminum hydroxide, aluminum silicate, calcium silicate, barium titanate, metal oxides, quartz powder, feldspar, nepheline syenite, mica, wollastonite, cellulose, aramid fibers, rayon fibers, cotton fibers, carbon fibers, wood flour, ground dolomite, ground marble, ground anthracite, ground bituminous coal, and mixtures of any of the foregoing.

In the context of the invention, the terms "filler particles" or "filler particle entities" are intended to include any particle or particle entity comprising any of the foregoing fillers, as well as any cells or pores that may exist in the rubber. Thus, the methods of the invention may also be used to measure the degree of cellular formation and cell distribution in rubber products, such as foam rubber products, or the porosity of rubber and other polymer products, such as sponges.

Intermediate rubber compound products are manufactured by the rubber processor according to the different requirements and specifications of each customer. By varying the mixtures of compounding ingredients, a wide variety of practical rubber intermediate products can be produced, each customized to the customers' needs. Thus, virtually thousands of different recipes for compounding mixtures exist for producing thousands of different rubber products. To assure the quality of the product and the uniformity of the product from batch to batch, mixing parameters and chemical composition must be carefully controlled. Thus, a fast and accurate quantitative measure of the quality of filler dispersion in a production environment to provide quality control of the rubber product is essential. The major piece of equipment used in rubber compounding is an internal mixer, such as a Banbury™ mixer (Farrel Corp.). Bales of rubber, pelletized carbon black, oil and other ingredients are charged into the mixing chamber where the mechanical action of the rotors, as modified by ram pressure and wall temperatures, causes changes in the physical state of the rubber and carbon black. In the first stages of rubber compounding, large bales of rubber are broken down and torn into small, relatively cold and stiff chunks by the mechanical action of the rotor and friction between the rotors and the bale. The reduction in rubber size is termed comminution. Next, the mechanical action of the rotors, coupled with heat transfer from the mixer walls and hot rubber already in the mixer, raises the rubber temperature and breaks it down so that the rubber becomes plasticated and capable of flowing like a fluid. In these early stages of mixing, poor temperature control of the rotors can lead to excessive slipping of the rubber bale during comminution and ingestion, drastically reducing the effective mixing time in a mixing cycle, resulting in poor mix quality and excessive batch-to-batch variability.

At the same time the rubber is being comminuted and ingested into the mixer, carbon black and other ingredients are being incorporated into the rubber. Incorporation of carbon black into rubber in the compounding process involves distinct phases, (i) incorporation, (ii) distribution, and (iii) dispersion. During incorporation, carbon black pellet fragments or large agglomerates are initially engulfed by the rubber. In the distribution phase the agglomerates are randomly distributed throughout the mass of the mixture. There is also a rapid breakage or rupture of large agglomerates into smaller ones as a result of internal stresses induced by viscous drag on the agglomerates. During the dispersion phase, the agglomerates become reduced in size and number under the shearing action of the rotors, with the formation of essentially colloidally dispersed aggregates in the liquid rubber.

The mixing times in rubber compounding are short, often ranging from 3 to 5 minutes. The time from carbon black addition to dump of the mixed load from the mixer is even shorter, often ranging from 1 to 3 minutes. Because of the short mixing times, the quality of dispersion of carbon black and other fillers in the rubber is dependent on selectable parameters in the mixer, eg., rotor speed (rpm), ram pressure, rotor temperature, temperature inside the mixer, temperature of the mixer walls, size of the batch, mixing time and the order in which the ingredients are charged into the mixer, as well as the chemical composition of the batch and the grade of the carbon black used. Quality control of the product is thus dependent upon the selection of the proper mixing parameters and the chemical composition of the batch, both of which control the quality of the dispersion of the fillers. A quantitative measurement of the dispersion of the filler particles is a valuable tool for quality control.

One embodiment of a system for quantitative dispersion analysis of the invention is illustrated in FIG. 1. A sample of cured or uncured rubber having a freshly cut flat smooth surface is prepared as described below. The cut surface of the sample comprises the polymer matrix and filler particle entities. The rubber sample 1 is placed on a mount 2 such that the freshly cut surface 3 is positioned securely and horizontally directly under the objective 11 of a camera 4. A light source 5 attached to the camera objective 11 provides reflected light off the freshly cut surface of the sample. An image of a section of the surface is captured by the camera 4, and electronically transmitted to a computer 6 and, optionally, a video printer 7. The video printer 7 is capable of producing a photograph of the magnified image, such as a 35 mm type photograph. A monitor 8 is electronically connected to the video printer 7 and displays the magnified image in real time.

Alternatively, the monitor 8 may be electronically connected directly to the camera 4. The computer 6 comprises a digital image board to allow the image to be manipulated by image enhancing software. A monitor 9 electronically connected to the computer 6 displays the image in digital form. The computer image analysis software grabs the pixels representing the image and enhances the definition of the filler particles against the polymer matrix background, as described further below. The particles are then measured and counted and the results presented in graph form, such as a histogram of counts versus size, for printing by a printer 10 connected to the computer 6.

The section of the surface of the rubber sample to be analyzed may be of any appropriate and desired dimension, such as a frame that is approximately ⅛ square inch to about ⅜ square inch, preferably ¼ square inch. More than one section of the surface may be imaged and the frame images compiled to produce one image analysis. The magnification of the image is produced on the monitors. Thus, the camera may have an objective of 1× (that produces no magnification) or, alternatively, may have an objective of a different magnification or a zoom feature that produces a higher or lower magnification than 1×. In the illustrated embodiment, with a 1× objective the image projected on the monitor and analyzed by the computer is approximately 34×. Although higher magnification is possible by using the zoom feature or a higher magnification objective, it is preferable that the magnification be 34× or less, such as 10× or 7×, in order to eliminate analysis of numerous very fine particles that are not significant in the dispersion analysis. A suitable video system that includes camera, printer, optics, camera monitor, lens, objective, photographic paper and film, etc. is available from Brook Anco, Rochester, N.Y.

Figure 7:
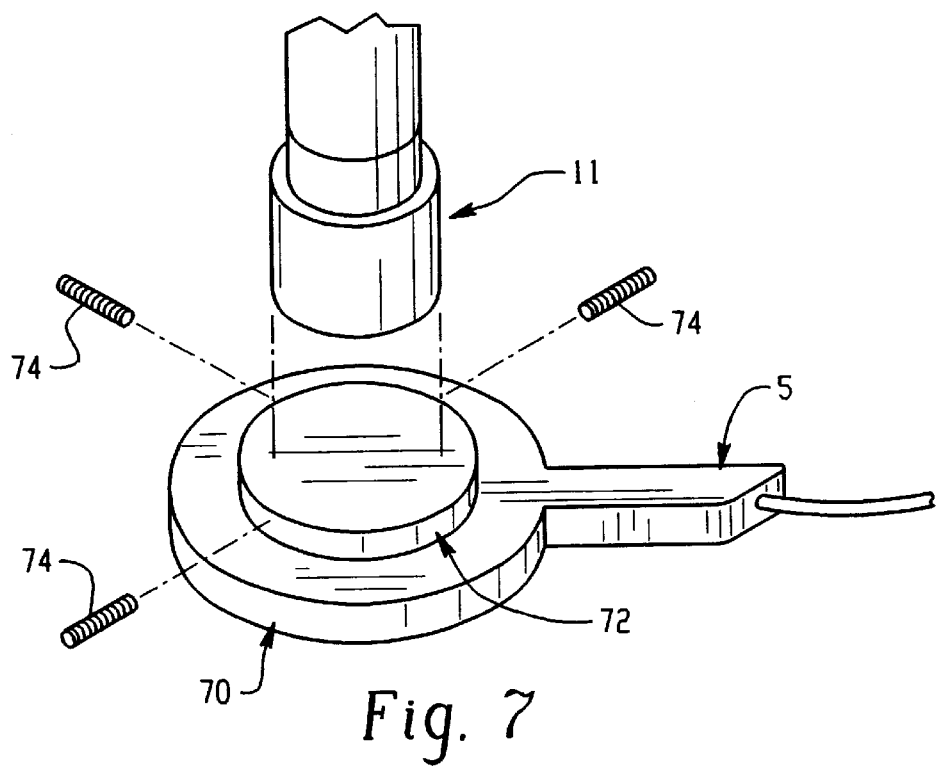
FIG. 7 is an exploded view of the fitting of a light fixture to a camera objective in the system of the invention.
Figures 8A, 8B:
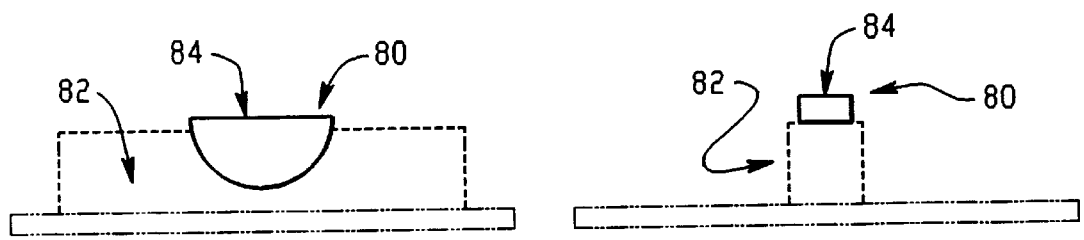
FIG. 8A is a cross-sectional schematic illustration of a cradle for holding the sample to be imaged.
FIG. 8B is another view of the schematically illustrated cradle and sample of FIG. 8A.

Any type of light source may be used to illuminate the surface of the sample, as long as it provides sufficient reflected light to allow computerized image analysis. Preferably the light source produces a flat white light without producing glare or shadow on the sample. Preferably, the light is a fluorescent ring light and has a maximum output switch rather than a variable light intensity control knob, thus eliminating the possible variable of light intensity in the illumination of the sample. A suitable light fixture is supplied by Stocker & Yale, Salem, N.H.). An embodiment of the attachment of a ring light fixture 5 to the objective 11 of the camera 4 illustrated in FIG. 1, is illustrated in an exploded view in FIG. 7. In the embodiment, the entire light fixture 5 is lighted when power is supplied. The light fixture comprises a ring 70 and an opening 72 to accommodate the through passage of the objective 11. The light fixture is then secured to the objective by means of screws 74.

The computer used in the methods of the invention may be any IBM compatible pentium computer having at least 32 MB of random access memory (RAM). In addition, any computer monitor, such as a Sony monitor, may be employed. A suitable laser printer for computer output is available from Hewlett Packard and a suitable video printer is available from Sony. Suitable computer image analysis software systems are the KS300 v.2.0 and KS400 Kontron Intuitive Image Analysis software (Carl Zeiss, Inc., Thornwood N.Y.), and software from Optimas (Bothell, Wash.) and Data Transmission Network Corp. (Omaha, Nebr.).

Sample Preparation

The rubber sample for image analysis by the methods of the invention may be a cured or an uncured sample. However, the sample surface to be examined is preferably freshly cut, flat, without voids, and without cut marks. Because it is often more difficult to obtain an uncured sample meeting these criteria, the sample preparation in the embodiment described below is a cured sample. The original sample may be of any shape or size that allows a cross sectional cut of a size that provides enough area for suitable frames to be imaged, such a frame having a dimension of about ⅛ square inch to about ⅜ square inch, preferably ¼ square inch. In the embodiments described below, a convenient sample is a cured button, approximately 1 to 2 inches in diameter and approximately ½ inch thick. The cured sample may be made in any suitable mold, such as a durometer mold, picco abrasion mold, compression set mold, or an ASTM hardness mold.

Figure 2:
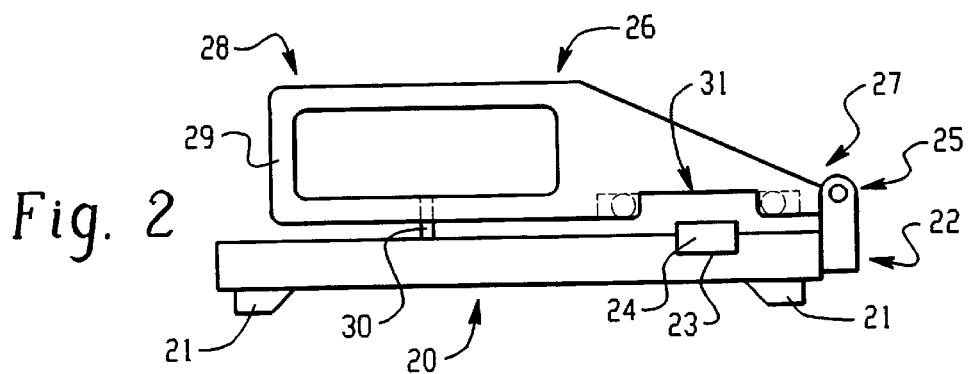
FIG. 2 is a schematic illustration of an apparatus for cutting a rubber sample to provide a smooth flat surf ace for image analysis.
Figure 4:
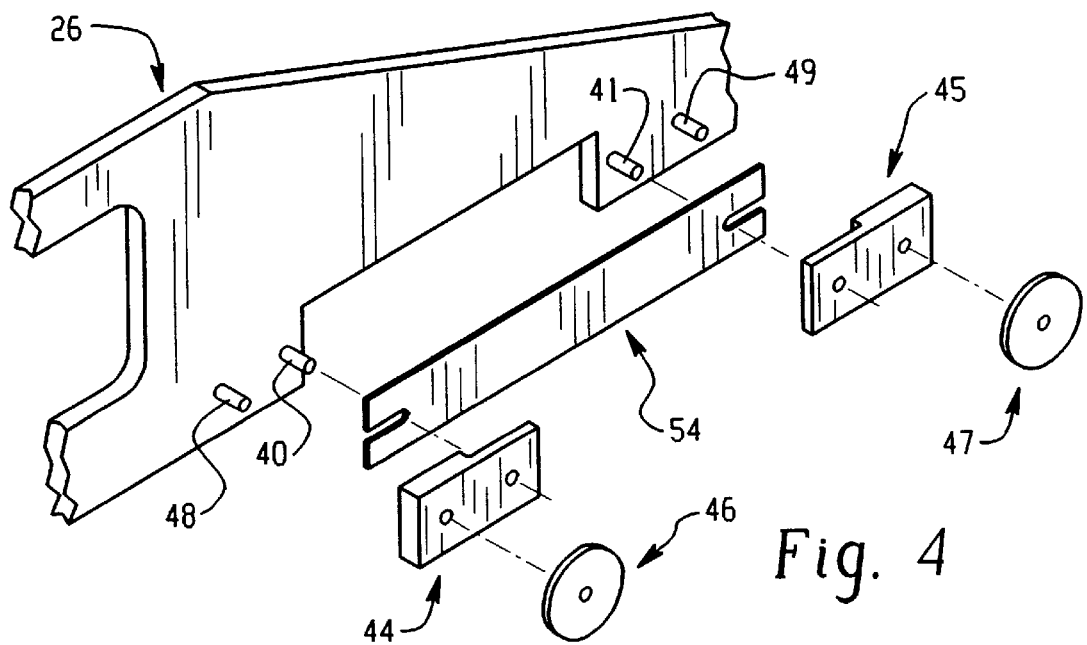
FIG. 4 is a schematic illustration of the cutting blade portion of the apparatus of FIG. 2.
Figure 5:
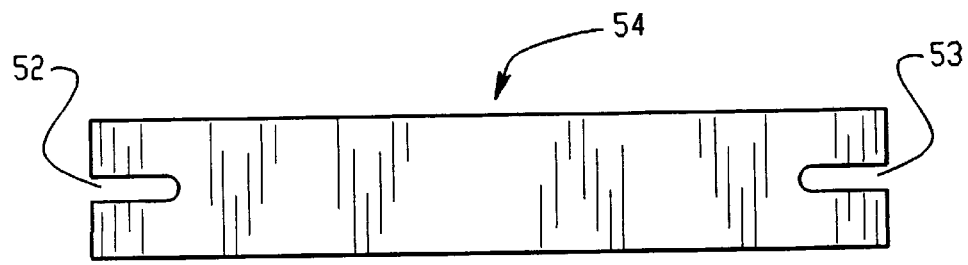
FIG. 5 is a schematic illustration of a cutting blade.

An embodiment of a sample cutting apparatus for use in preparing a sample for image analysis is illustrated in FIG. 2. The cutting apparatus comprises a base section 20, preferably a heavy base section, having a top, two ends, and at least two anchoring feet 21, preferably rubber feet, for stability and to keep the apparatus from moving during the cutting procedure. The base section 20 further comprises a perpendicular section 22 at one end comprising a hinge 25. At a position on the top of the base proximate to the perpendicular section 22, there is a shallow opening 23 to accommodate a cutting block 24, preferably a plastic block, such as a polyethylene block, for holding the rubber sample to be cut. At a site proximate to the other end of the base section 20, there is a small perpendicular stop 30 that provides a resting position for a longitudinal member 26. The longitudinal member 26 comprises two ends 27 and 28, wherein end 27 is rotationally connected to the hinge section 5 of the base 20 to provide raising and lowering of the longitudinal member when cutting the rubber sample. The other end of longitudinal member 28 may further comprise a handle, such as handle 29. In the lowered position, the longitudinal member 26 is supported by the stop 30. The longitudinal member 26 further comprises an opening 31 directly opposed to the cutting block 24 on the base section 20 for attachment of a cutting blade 54 illustrated in FIG. 5. The size of the opening 31 is sufficient to accommodate the length of the cutting blade. As illustrated in FIGS. 4 and 5, two pins 40 and 41 are attached to the longitudinal member 26, one on each side of opening 31 for accommodating slots 52 and 53 of the cutting blade 54. Two blade holders 44 and 45, each having a notched section to accommodate the cutting blade and pins 40 and 41, are provided to hold the blade in place on the longitudinal member. Thumb wheels 46 and 47 are turnable to attach the blade holders to thumb wheel screws 48 and 49 to secure the blade holders and the blade to the longitudinal member.

Figure 3:
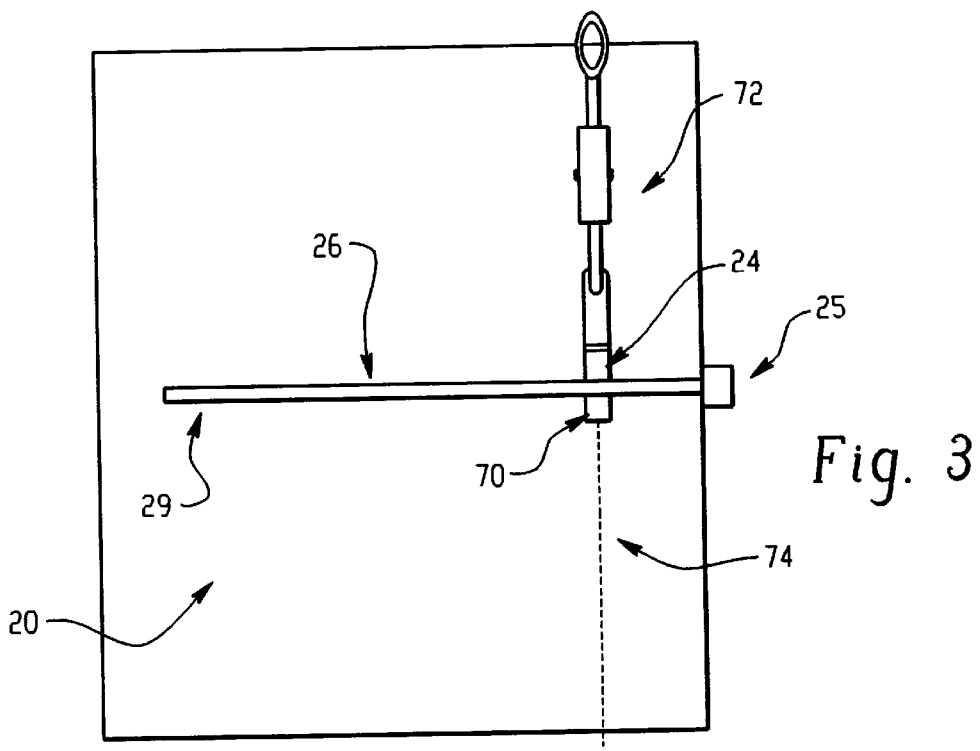
FIG. 3 is a schematic illustration of a top view of the apparatus of FIG. 2 illustrating clamping of the sample to provide stability during the cutting procedure.
Figure 6:
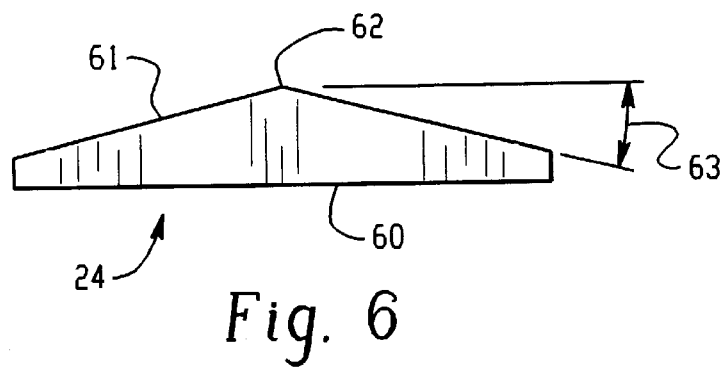
FIG. 6 is a schematic illustration of a cutting block for holding the sample to be cut.

The cutting block 24 is illustrated further in FIG. 6 and comprises a bottom 60 which is insertable into the shallow opening 23 of the base section of the cutting apparatus in a close fit for securing the cutting block therein. From the bottom 60 of the cutting block, the cutting block comprises a shallow cone 61 culminating in an apex 62, such that the angle 63 formed by the cone 61 and the bottom 60 comprises an angle from 5° to 15°, preferably 10°. Thus, a sample placed on the cutting block 24 lies at an angle for cutting purposes. As illustrated in FIG. 3, a sample 70 is held in place on the cutting block 24 by two similar clamping devices 72 and 74 (represented by a dotted line), one on either side of the sample.

The rubber sample is cut, preferably in half, to provide a smooth cross section surface. The sample cutter comprises a sharp blade that produces a smooth, flat cut without leaving substantial blade marks on the sample at the magnification used for dispersion measurement. Preferably the blade does not dull quickly and is sturdy so as not to be easily distorted when cutting through the thickness of the sample. Exemplary blades are a GEM single edge industrial razor blade, a Schick double edge platinum razor blade, a hose cutter blade (Kwikcut Model BT 150, Cutter Dawn Industries, Denver, Colo.), a carpet cutting blade (precision ground double edge high carbon steel blade, #59168, Vermont-American), a utility knife blade (hardware store variety), and a microtome blade. Although each of these blades could be used, it was discovered that each has certain advantages and disadvantages when used with the illustrated apparatus. For example, both the GEM razor blade and the utility knife blade produce cuts with some microscopic blade marks and the blade must protrude significantly to cut through the button; the Schick blade gives a smooth cut but, because it is flimsy and easily distorted, it tends to produce a crooked cut and it is not easily mounted in the illustrated apparatus to cut ½" thick specimens, the preferred sample thickness. The carpet cutting blade does not produce as smooth a cut as the Schick blade, but it is sturdy, easily mountable in the illustrated apparatus, and is capable of cutting samples ½" thick. The hose cutter blade produces an uneven cut with unwanted drag on the button. The microtome blade produces the smoothest cut substantially without microscopic blade marks, is sturdier than the carpet blade, and is capable of cutting ½" thick cured durometer buttons. Therefore, the microtome blade is preferred for use in the illustrated cutting apparatus when cutting cured durometer buttons. More preferably, the microtome blade is a disposable microtome blade, such as the Shur/Sharp disposable microtome blade available from Fisher Scientific.

Figures 9A, 9B:
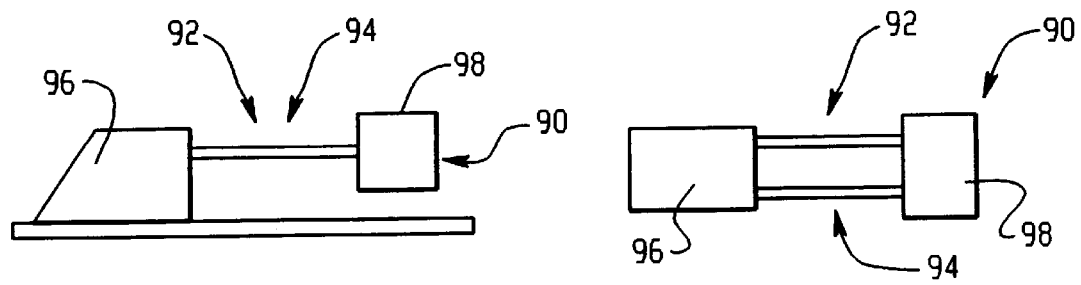
FIG. 9A is a side view schematic illustration of another embodiment of an apparatus to hold the sample to be imaged.
FIG. 9B is top view schematic illustration of the apparatus and sample of FIG. 9A.
Figure 10A:
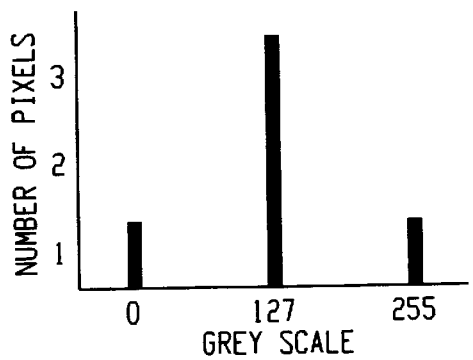
FIG. 10 (A–F) is a group of schematic graphical representations of computer-assisted pixel manipulation for enhancing and separating particles from the polymer matrix.
Figure 10B:
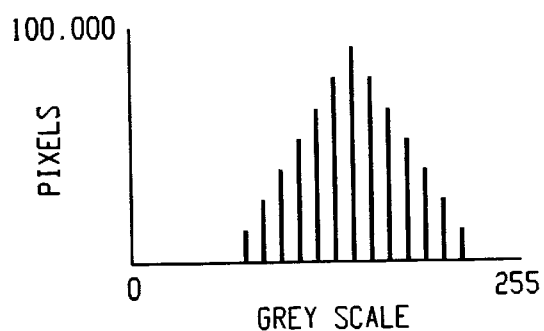
Figure 10C:
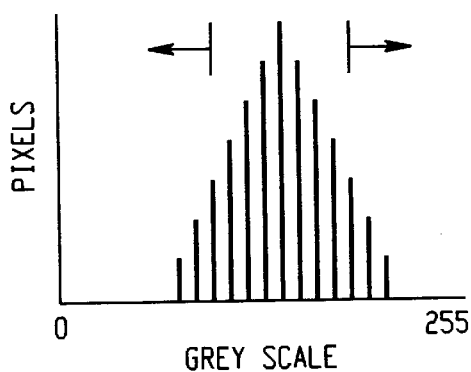
Figure 10D:
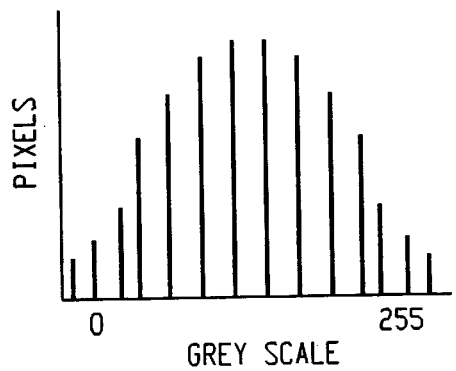
Figure 10E:
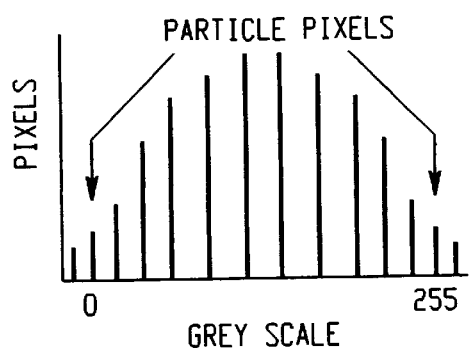
Figure 10F:
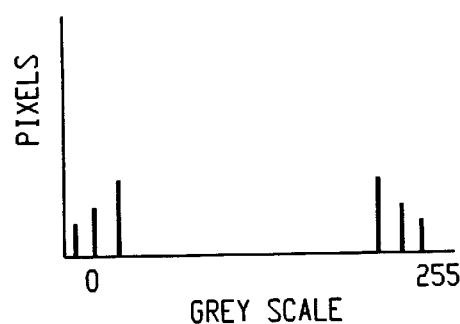

The sample may be mounted for image analysis by any method that secures the sample during the analysis and presents the freshly cut sample surface completely horizontally. Exemplary suitable mounting apparatuses for sample mounting are illustrated in FIGS. 8A, 8B, 9A and 9B. In the embodiment illustrated in FIG. 8A, the sample is a durometer button 80 of cured rubber that is disc shaped. Thus, when cut in a cross section, such as in half, the shape of the button is a semi-circular disc, also shown in a cross sectional view in FIG. 8B. The button is secured by placing it in a sturdy cradle 82, such as a wooden cradle, such that the surface 84 of the button protrudes above the cradle in order to prevent the cradle itself from interfering with the illumination and the image transmitted to the computer. In another embodiment illustrated in FIGS. 9A and 9B, a rubber sample 90 is suspended in air by pins 92 and 94 secured to a base structure 96. FIG. 9B is a top view of the apparatus looking down on the cut surface 98 of the sample 90.

In one embodiment of the invention, a method is provided for measuring the dispersion of filler particles in rubber that comprises the steps of cutting a processed rubber sample to provide a smooth flat surface comprising a polymer matrix and filler particle entities; lighting the surface to provide reflected light from a section of the surface; capturing a magnified image of the lighted section of the surface; transmitting the magnified image to a computer comprising software for image analysis; processing the magnified image using a series of computer commands including (i) a first group of commands that captures the image, (ii) a second group of commands that enhances the image, (iii) a third group of commands that distinguishes the filler particle entities from the polymer matrix, (iv) a fourth group of commands that defines each of the particle entities according to a computer-generated definition comprising pixels and grey scales and labels each of the particle entities falling within a minimum limit and a maximum limit for pixels and grey scales and, (v) a fifth group of commands that displays the computer-generated labels of the particle entities as a representation of the number of particle entities comprising each size of a plurality of particle entity sizes to provide a measurement of the dispersion of the filler particle entities in the rubber sample.

In another embodiment of the invention, a method is provided for controlling the quality of dispersion of filler particles in rubber and comprises the steps of mixing a filler with a polymer in a mixer having a selectable mixing parameter to obtain a processed rubber product having a chemical composition and comprising a dispersion of filler particles in a polymer matrix; obtaining a sample of the processed rubber product; cutting the rubber sample to provide a smooth flat surface; lighting the surface to provide reflected light from a section of the surface; providing a magnified image of the lighted section of the surface; transmitting the image to a computer comprising software for image analysis; processing the magnified image using a series of computer commands including (i) a first group of commands that captures the image, (ii) a second group of commands that enhances the image, (iii) a third group of commands that distinguishes filler particle entities from the polymer matrix, (iv) a fourth group of commands that defines each of the filler particles entities according to a computer-generated definition comprising pixels and grey scales and labels each of the particle entities falling within a minimum limit and a maximum limit for pixels and grey scales and, (v) a fifth group of commands that displays the computer-generated labels of the filler particle entities as a representation of the number of filler particle entities comprising each size of a plurality of filler particle sizes to provide a first dispersion measurement; providing a predetermined dispersion reference range for an allowable number of filler particles comprising each size of a plurality of allowable particle sizes; and comparing the first dispersion measurement with the reference dispersion range, wherein when the particle sizes or the particle numbers comprising the first dispersion measurement fall outside the dispersion reference range for the allowable particles numbers or the allowable particle sizes, the method further comprises the step of modifying a mixing parameter or the chemical composition of the rubber to provide a second processed rubber product having an allowable dispersion measurement.

Preferably the modifiable mixing parameter comprises a selection from the group consisting essentially of rotor speed, ram pressure, rotor temperature, temperature inside the mixer, temperature of the mixer walls, size of the batch, mixing time, order of ingredient addition to the mixer, and combinations of any of the foregoing. Modifying the chemical composition may comprise modifying any of the ingredients, such as by substituting a different ingredient that performs the same function as an original ingredient, or by using a different grade of carbon black.

In each of the embodiments of the methods of the invention, the size of the particle entities is preferably expressed either as comprising a measurement of particle area or a measurement of maximum feret diameter. When the rubber sample comprises foam rubber and the filler particles comprise pores, preferably the measurement of particle size comprises the pore area.

The reference dispersion range is a standard for a product of acceptable quality and is developed for each rubber product manufactured according to the customers' specifications. Development of the standard may be based, for example, on historical filler dispersion measurements in quality products.

The processing of the image comprises capturing the image, enhancing the image, determining the criteria for particle selection, and displaying the data. Capture of the image occurs when a "snap shot" of the image is captured by the digital image board of the computer. The computer digital image analysis defines images in terms of pixels in black, white and greyscales. Each pixel in the captured image has a greyscale value which determines how white or black the pixel will be. A number value is assigned to greyscale; pure white is 255 and pure black is 0. The greys are the values in between. By adding numbers to or subtracting from the greyscale values, the image can be made darker or lighter. The computer stores the image in a table as a list of pixel numbers, locations and greyscales. The tables, and thus the image, can be manipulated mathematically by the computer to produce a new digital image with each manipulation and enhance the original image.

The particles are initially dark or light pixel values on the grey rubber (polymer matrix) background. By making the darkest pixels darker (black), the lightest pixels lighter (white), and leaving the grey polymer matrix background the same, the image is enhanced or contrasted and the particles are more easily seen. As illustrated in A and B of FIG. 10, pixels may be plotted on a histogram of the number of pixels at each grey value from 0 to 255. The particles are usually the lightest and darkest pixels in an image, so the particles are represented in the histogram in the "tails", whereas the bulk of the pixels represent the grey pixels of the polymer matrix. To add contrast, the tails of the histogram are stretched wider (C, D), and the dark pixels (or particles) are now darker, the light pixels (or particles) are now whiter and most of the grey background is about the same (E). The computer does this by adding to or subtracting from the greyscale values in the image data table. The computer then deletes the grey values representing the polymer matrix from the image data table to produce a histogram (F) illustrating selected pixels representing particles only.

Figure 11A:
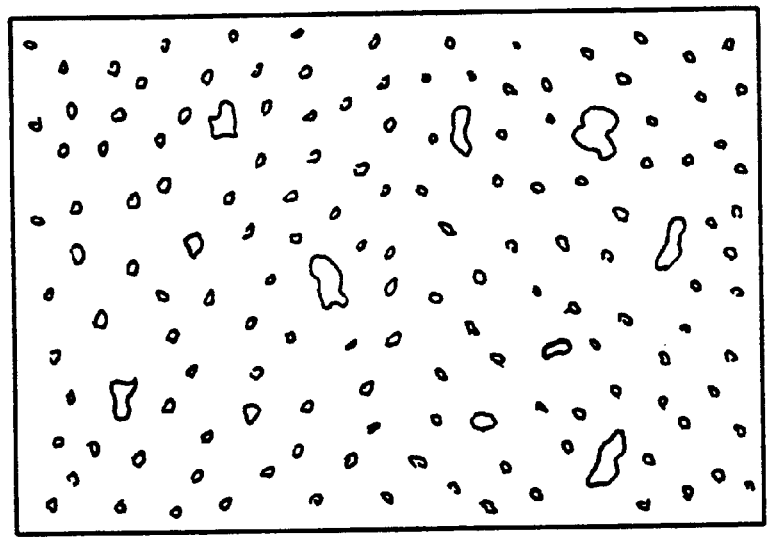
FIG. 11 (A, B) are schematic representations of computer-assisted pixel manipulation for filtering noise from the particle image.
Figure 11B:
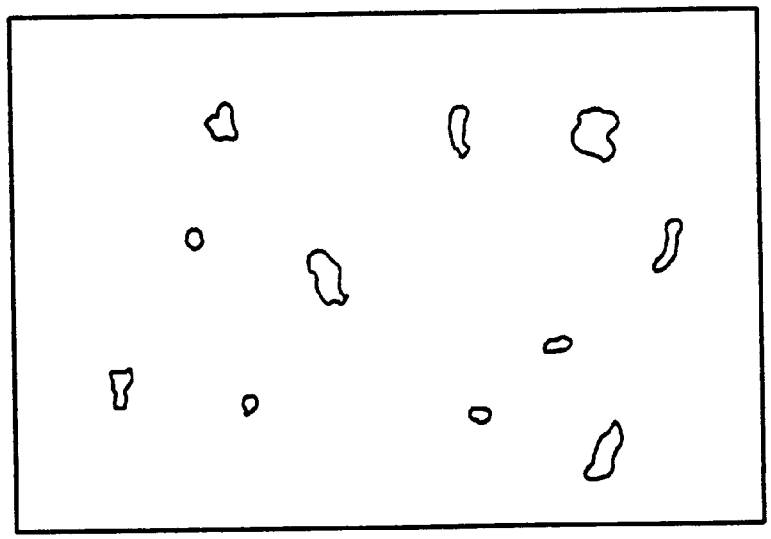

As illustrated in FIG. 11A, all of the particle pixels are then given a single color (such as white) against a contrasting background (such as black). Noise, such as line interference in the electronics, unwanted light reflections off the sample, and the like, appears in FIG. 11A as random dots generally only several pixels or smaller in size. The noise may be filtered out of the image by use of statistical filters and/or scrap function filters. Using statistical equations, a filter analyzes the size, greyscale and the number of pixels and then compares it to its surroundings and eliminates the particle if it does not meet certain criteria. A scrap filter eliminates particles below a predetermined pixel count, e.g.

5. Once a filter is applied, only the larger, more distinct particles remain (11B).

To count the particles and measure their size, the software labels each particle for identification and measures the size as area or feret. Area is measured by counting the number of pixels in the particle and converting the pixel count into a real measurement, such as square inches or square millimeters. Feret is similar to diameter. For an irregularly shaped particle, the maximum feret is the length of the longest line that can be drawn within the particle. For example, long thin particles, such as fibers, may have large maximum feret values. To display the data, a graph, such as a histogram, of a plot of count verses measurement is obtained. Calibration of the conversion of pixels to geometry may be performed periodically by the use of Ronchi Rulings, as known to those skilled in the art of image analysis.

A series of computer commands is used to process the magnified image of the rubber sample. Preferably, the computer commands for processing a sample of a single rubber product are contained in a macro (program) that is specific for analysis of that particular rubber product or a similar rubber product. Thus, each macro of a plurality of macros may be designed to specify a different set of commands for analyzing samples of differing rubber products. Each macro contains computer commands for capturing the image, enhancing the image, determining the criteria for particle selection, and displaying the data. An example of a suitable macro is illustrated in Table 1.

TABLE 1

| Macro |
| --- |
| setframe "size" |
| setobj "test" |
| tvsetup |
| tvframe 10,0,636,480 |
| tvlive |
| tvinput 1 |
| lowpass 1,2,19,1 |
| shadcorr 1,2,3,0,1 |
| normalize 3,4,30 |
| imgdisplay 1 |
| dislev 4,6,254,1,1,1 |
| median 6,7,5 |
| binscrap 7,8,5,500,1 |
| binfill 8,9 |
| setgeom "standard" |
| measobj 9,2, "test" ,0 |
| datahisto "test","AREA",0,25,5,50,100.0 |

Each of the commands in the macro is described below:

Capturing the Imaae setframe "size":

The image size to be scanned by the computer is selected. For example, a ¼ square inch image frame can be "cropped" to a ⅛ square inch image frame.

setobj "test":

The computer names the database "test" or another selected name for data storage.

tvsetup:

This command comprises a "hand shake", telling the computer digital board what kind of camera signal is to be transmitted and read.

tvframe:

This command defines the "box" or size of the image to be transmitted to the monitor. The image can be cropped again by this command.

(Commands may be inserted here to provide a "loop" to produce compilation of images. Such commands are illustrated and described further for the computer macro of Table 3).

tvlive:

This command allows a real-time image of the sample to appear on the computer monitor. This command is active only for so long as the tvlive command is active.

tvinput:

This command freeze-frames, i.e. captures, the image "1" to be analyzed and puts it into digital memory. The connection between the camera and the computer is now severed.

Enhancing the Image lowpass:

This command mathematically defocuses the image 1 to smooth the image and produce a new image 2.

shadcorr:

This command (shading correction) compares images 1 and 2, mathematically "inverts" image 1, mathematically averages the images, and adds light to dark areas and dark to light areas to correct for uneven shading. The corrected image is stored in memory as image 3.

normalize:

This command stretches image 3, as illustrated in FIG. 10 (C, D) and stores the stretched image as 4.

imgdisplay:

This command displays the stretched image 4 as a histogram.

dislev:

This command (dislevel) deletes all unwanted pixels in the middle of the histogram. For example, all pixels having greyscale values between 1 and 254 are deleted from image 4, leaving only the blackest and whitest pixels in image 6.

median:

This is a filter for filtering out noise, as described above.

binscrap:

This command (binary scrap) eliminates any pixel smaller than 5 or larger than 500 and saves the new image as image 7.

binfill:

This command (binary fill) fills in any uneven shading (eg. doughnut holes) of the particles.

Particle Selection setgeom "standard":

This command converts pixels to a geometry to be measured, such as feret, diameter, circumference, area, and the like.

measobj:

This command labels each of the particles and measures the particle based on the geometry to be measured.

Display of the Data datahisto "test", "AREA":

This command displays the data as a histogram of particle count versus area. The data may alternatively be displayed as a histogram of particle count versus maximum feret ("FERETMAXI").

The following examples are illustrative of the methods and computer macros of the invention. The examples, however, are not to be considered limiting, since other rubber chemical compositions, mixing parameters, and computer macros may be employed.

Example 1

A rubber composition (sample 1) comprising the ingredients listed in Table 2 was processed in a mixer under three different sets of mixing parameters (i.e. set A, set B, set C) and a sample of each of the three products (i.e. samples 1A, 1B, 1C) were obtained.

TABLE 2

| Compound | Parts by Weight |
| --- | --- |
| EPDM* | 100 |
| Carbon Black | 100 |
| Oils | 50 |
| Anti-degradants | 10 |
| Dispersing Agents | 5 |
| Curing Agents | 8 |
| Mineral Fillers | 50 |
| Activators & Misc. | 20 |

*ethylene propylene diene monomer

TABLE 3

| Macro Example |
| --- |
| setframe "size1" |
| setobj "Area" |
| tvsetup |
| tvframe 10,0,636,480 |
| append=0 |
| fail=100 |
| for i9=1,i9 <= 8,i9 = i9+1 |
|     tvlive |
|     tv input 1 |
|     lowpass 1,2,27,3 |
|     shadcorr 1,2,3,1,1 |
|     normalize 3,4,25 |
|     dislev 4,5,253,2,1,1 |
|     median 5,6,3 |
|     binscrap 6,7,5,500,1 |
|     binfill 7,8 |
|     measobj 8,2, "area", "append" |
|     append= 1 |
|     write "Number of frames completed= ",i9,"0=false,1=true" |
|     write "Number of pqarticles counted so far is ",fail |
| endfor |
| setgeom "13482 inch" |
| datahisto "area","AREA",0,75,5,50,25.0,"D sample" |
| append= 0 |
| write "Value for append =",append,"0=false,1=true" |

A 1 inch diameter, ½ inch thick durometer button was prepared for each sample and each sample was freshly cut to provide a smooth flat surface for filler dispersion analysis. An image having a ¼ square inch frame was made of each sample surface. The computer macro used to analyze the image is illustrated in Table 3. This particular macro analyses a compilation of eight superimposed images. This is accomplished by using the computer commands "for i5=1..." which begins the loop and "endfor" sends the loop back to for i . . . until i is satisfied.

Figure 12:
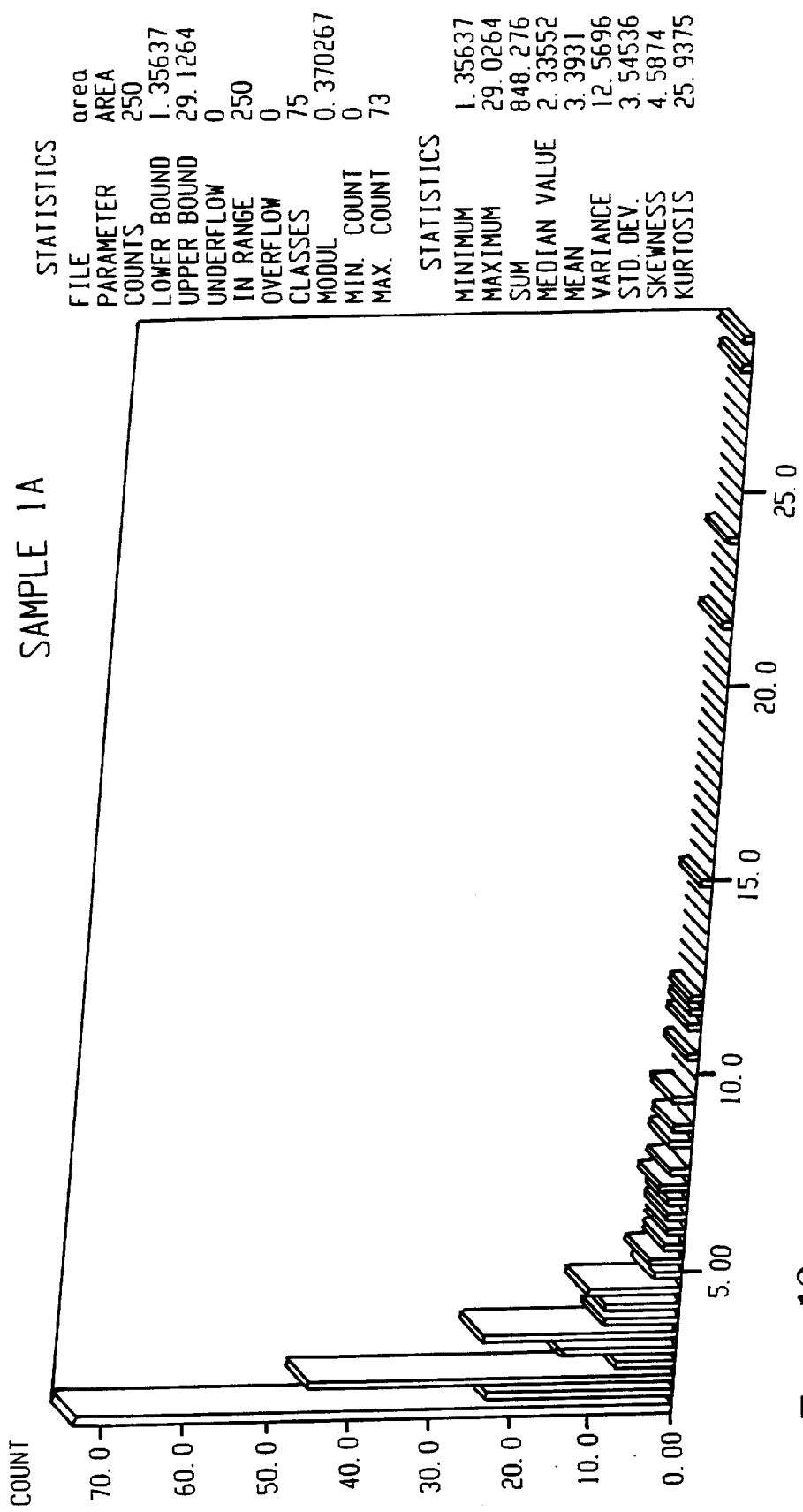
FIGS. 12–16 illustrate histogram representations of data from computer generated image analysis with reference to Examples 1 and 2.
Figure 13:
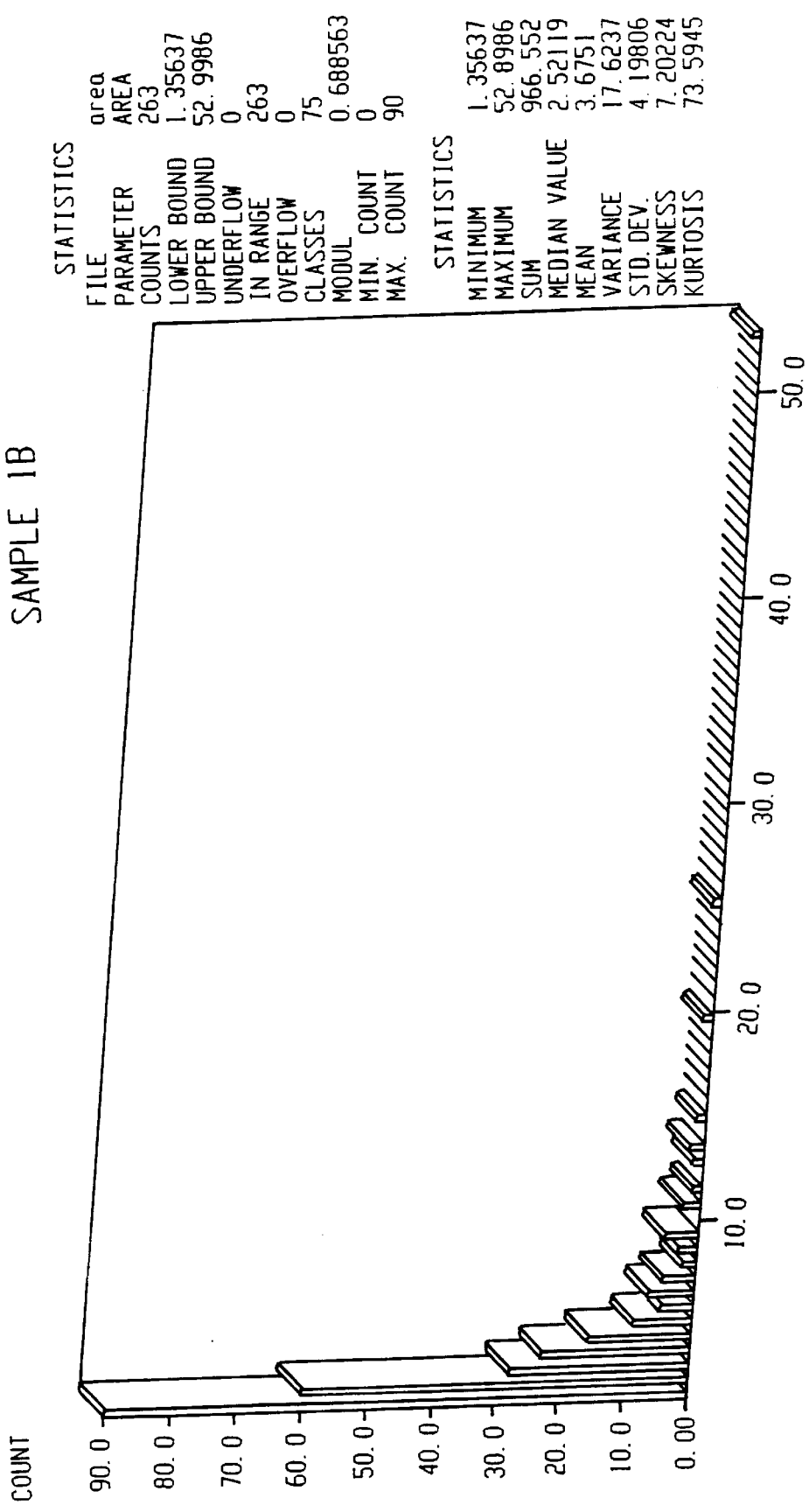
Figure 14:
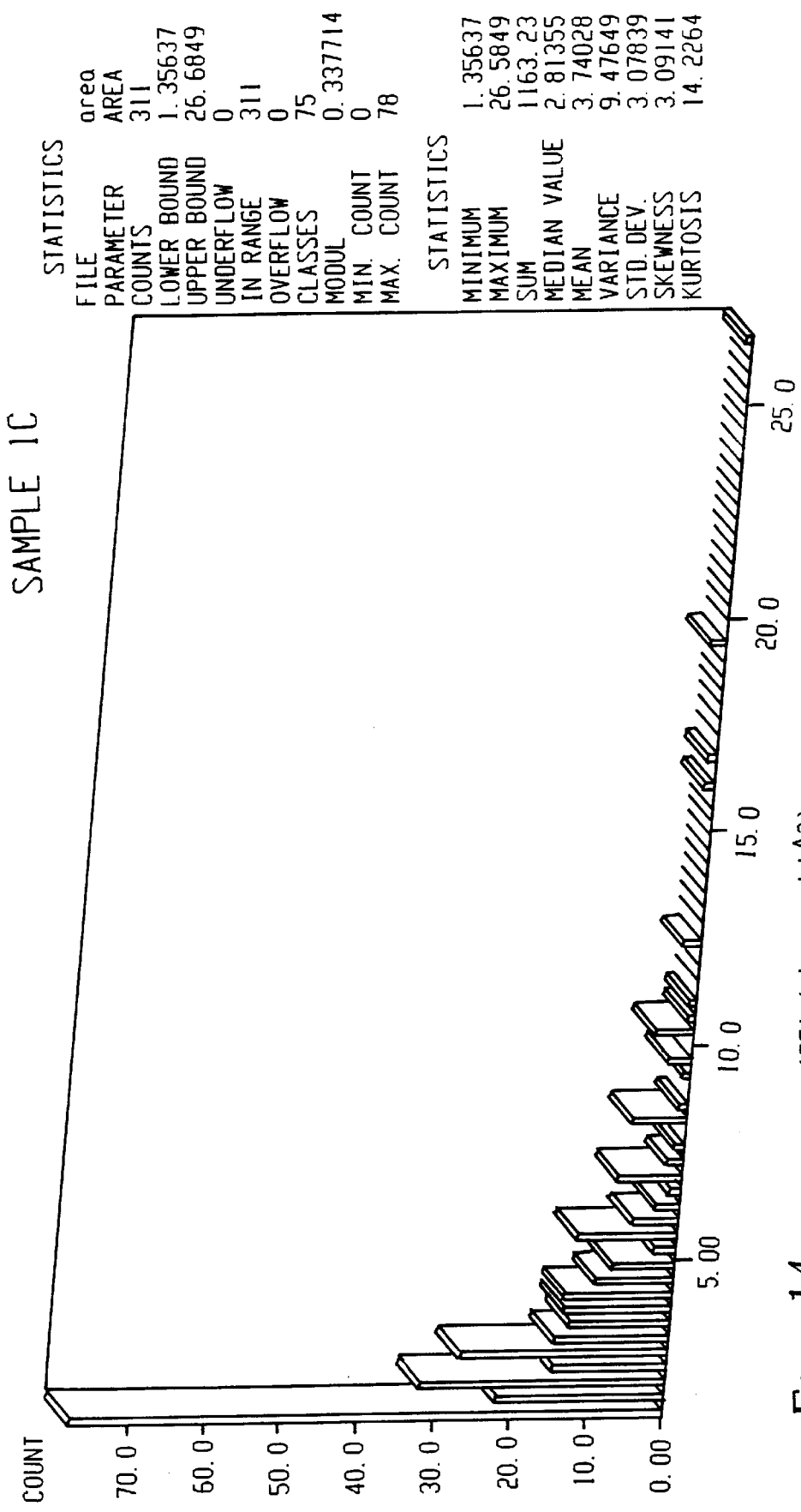

The results of the dispersion analysis are illustrated as histograms in FIGS. 12, 13 and 14. A comparison of samples 1A, 1B, and 1C illustrates that 1A has fewer particles (250) than either 1B (263) or 1C (311). The size (area) of the maximum size particle in sample 1A is about 29 square microns, whereas the size of the maximum size particle in sample 1B is about 53 square microns and in sample 1C is about 26.5 square microns. The sum of the areas of all the particles of samples 1A, 1B and 1C is 848 square microns, 967 square microns and 1,163 square microns, respectively. Sample 1A has lowest particle count, the lowest maximum sum of particle areas, and the second lowest maximum particle size. Therefore, of the three samples, sample 1A shows the best particle dispersion.

From the quality of the product produced using the mixing parameters "A", the customer now has the opportunity to determine if the product is acceptable. If the product is acceptable, the mixing parameters "A" are adopted for mixing each future batch of the product, to provide product uniformity from batch to batch. If the product is not acceptable to the customer, mixing parameters can be changed as often as needed to improve filler dispersion until a product acceptable to the customer is obtained.

EXAMPLE 2

Figure 15:
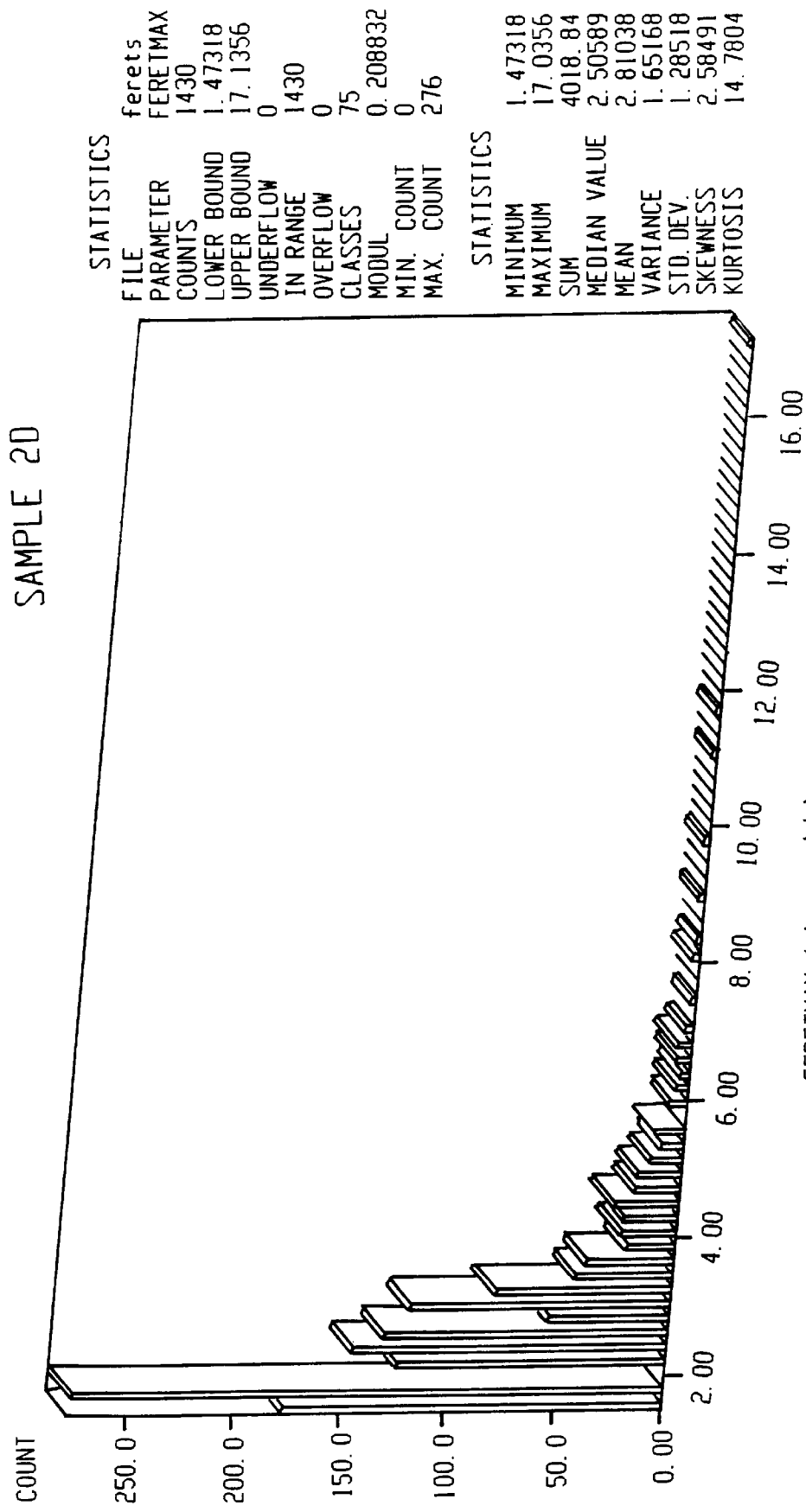

A rubber composition (sample 2) comprising a set of ingredients (not shown) was processed under mixing parameter set "D". A sample having a cut surface for image analysis was obtained, as described for the samples of Example 1. The computer macro used to analyze the image is illustrated in Table 4. The results of the dispersion analysis are illustrated as a histogram in FIG. 15. The measurement of the particle sizes was the maximum feret (microns).

Sample 2D has a high particle count (1430), a high sum of the maximum feret measurements (about 4,019 microns), and a largest particle having a maximum feret of 17 microns. The customer for this rubber product reported to the company that products were being returned because of defects in the products. Therefore, it was determined that the filler dispersion in this rubber product was unacceptable.

Figure 16:
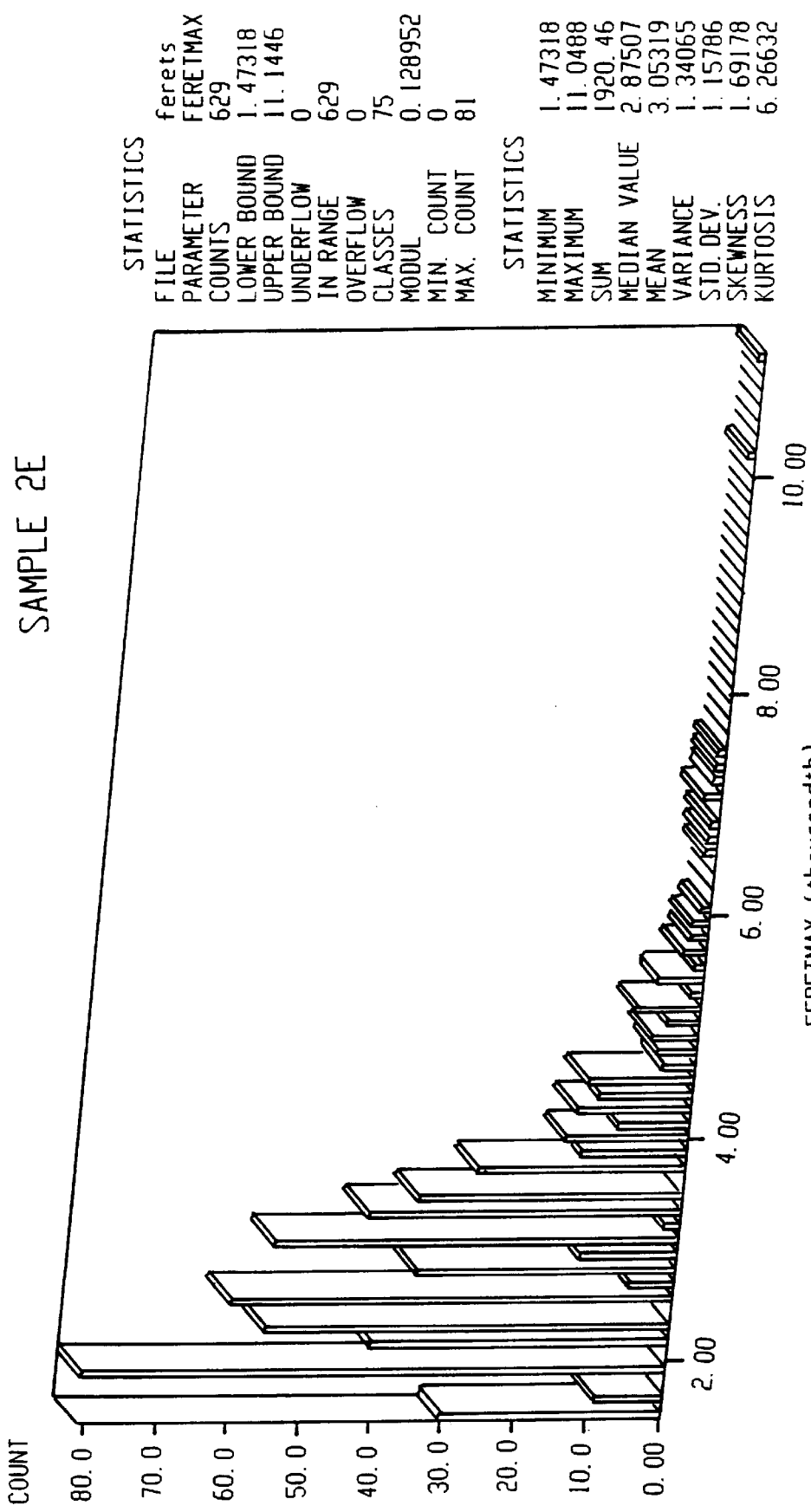

The same rubber composition was then processed using a different set of mixing parameters "E" in which at least the mixing time was increased, and a new sample 2E was obtained. Computer dispersion analysis of sample 2E is illustrated in FIG. 16. Sample 2E shows a lower total particle count (629) than sample 2D, a lower sum of the maximum feret measurements (about 1,920 microns), and a largest particle having a maximum feret of 11 microns. Sample 2E showed a marked improvement of the dispersion of filler particles over that of sample 2D. Therefore, a change in mixing parameters can improve filler dispersion in rubber samples.

TABLE 4

Macro Example 2 setframe "size1"
setobj "ferets"
tvsetup
tvframe 10,0,636,480
tvlive
tvinput 1
lowpass 1,2,27,1
shadcorr 1,2,3,2,1
normalize 3,4,7
dislev 4,5,211,0,1,1
binfill 5,6
binscrap 6,7,5,400,1
setgeom "13842 inch"
measobj 7,2, "ferets" ,0
datahisto "ferets","FERETMAX",0,75,2,20,30.00,"compound____
____Date____
V  e  r  s  i  o  n    I  n  f  o    #  2
lowpass=27;shadcorr=3,2,1;norm=7;dislev=246,76,1,
l;bin=3,400;

While the invention has been described herein with reference to the preferred embodiments, it is to be understood that it is not intended to limit the invention to the specific forms disclosed. On the contrary, it is intended to cover all modifications and alternative forms falling within the spirit and scope of the invention.

I claim:

1. A method for measuring the dispersion of filler particles in rubber, comprising the steps of:
   cutting a processed rubber sample to provide a smooth flat surface comprising a polymer matrix and filler particle entities;
   lighting the surface to provide reflected light from a section of the surface;
   capturing a magnified image of the lighted section of the surface;
   transmitting the magnified image to a computer comprising software for image analysis; and
   processing the magnified image using a series of computer commands including (i) a first group of commands that captures the image, (ii) a second group of commands that enhances the image, (iii) a third group of commands that distinguishes the filler particle entities from the polymer matrix, (iv) a fourth group of commands that defines each of the particle entities according to a computer-generated definition comprising pixels and grey scales and labels each of the particle entities falling within a minimum limit and a maximum limit for pixels and grey scales and, (v) a fifth group of commands that displays the computer-generated labels of the particle entities as a representation of the number of particle entities comprising each size of a plurality of particle entity sizes to provide a measurement of the dispersion of the filler particle entities in the rubber sample.

2. The method of claim 1, wherein the filler particle entities are selected from the group consisting essentially of carbon black, magnesium oxide, zinc oxide, titanium dioxide, silicas, clay, talc, iron oxide, alumina trihydrate, silicons, ceramics, chalk, calcium sulfate, calcium hydroxide, barium sulfate, calcium carbonate, silicates, zinc sulfide, graphite, beryllium oxide, lead oxide, carbides, molybdenum sulfide, barium ferrite, zirconium silicate, aluminum hydroxide, aluminum silicate, calcium silicate, barium titanate, metal oxides, quartz powder, feldspar, nepheline syenite, mica, wollastonite, cellulose, aramid fibers, rayon fibers, cotton fibers, carbon fibers, wood flour, ground dolomite, ground marble, ground anthracite, ground bituminous coal, and mixtures thereof.

3. The method of claim 1, wherein the rubber sample is uncured.

4. The method of claim 1, wherein the displayed particle entity size comprises a measurement of particle area.

5. The method of claim 1, wherein the displayed particle entity size comprises a measurement of maximum feret diameter.

6. The method of claim 1, wherein the rubber sample comprises foam rubber and the filler particles comprise pores.

7. The method of claim 6, wherein the displayed particle entity size comprises a measurement of the pore area.

8. A method for controlling the quality of dispersion of filler particles in rubber, comprising the steps of:
   mixing a filler with a polymer in a mixer having a selectable mixing parameter to obtain a processed rubber product having a chemical composition and comprising a dispersion of filler particles in a polymer matrix;
   obtaining a sample of the processed rubber product;
   cutting the rubber sample to provide a smooth flat surface;
   lighting the surface to provide reflected light from a section of the surface;
   providing a magnified image of the lighted section of the surface;
   transmitting the image to a computer comprising software for image analysis;
   processing the magnified image using a series of computer commands including (i) a first group of commands that captures the image, (ii) a second group of commands that enhances the image, (iii) a third group of commands that distinguishes filler particle entities from the polymer matrix, (iv) a fourth group of commands that defines each of the filler particles entities according to a computer-generated definition comprising pixels and grey scales and labels each of the particle entities falling within a minimum limit and a maximum limit for pixels and grey scales and, (v) a fifth group of commands that displays the computer-generated labels of the filler particle entities as a representation of the number of filler particle entities comprising each size of a plurality of filler particle sizes to provide a first dispersion measurement;

providing a predetermined dispersion reference range for an allowable number of filler particles comprising each size of a plurality of allowable particle sizes; and comparing the first dispersion measurement with the reference dispersion range, wherein when the particle sizes or the particle numbers comprising the first dispersion measurement fall outside the dispersion reference range for the allowable particles numbers or the allowable particle sizes, the method further comprises the step of:

modifying a mixing parameter or the chemical composition of the rubber to provide a second processed rubber product having an allowable dispersion measurement.

9. The method of claim 8, wherein modifying a mixing parameter comprises modifying a selection from the group consisting essentially of rotor speed, ram pressure, rotor temperature, temperature inside the mixer, temperature of the mixer walls, size of the batch, mixing time, order of ingredient addition to the mixer, and combinations thereof.

10. The method of claim 8, wherein modifying the chemical composition comprises using a different grade of carbon black.

11. The method of claim 8, wherein the filler particle entities are selected from the group consisting essentially of carbon black, magnesium oxide, zinc oxide, titanium dioxide, silicas, clay, talc, iron oxide, alumina trihydrate, silicons, ceramics, chalk, calcium sulfate, calcium hydroxide, barium sulfate, calcium carbonate, silicates, zinc sulfide, graphite, beryllium oxide, lead oxide, carbides, molybdenum sulfide, barium ferrite, zirconium silicate, aluminum hydroxide, aluminum silicate, calcium silicate, barium titanate, metal oxides, quartz powder, feldspar, nepheline syenite, mica, wollastonite, cellulose, aramid fibers, rayon fibers, cotton fibers, carbon fibers, wood flour, ground dolomite, ground marble, ground anthracite, ground bituminous coal, and mixtures thereof.

12. The method of claim 8, wherein the rubber sample is uncured.

13. The method of claim 8, wherein the displayed particle entity size comprises a measurement of particle area.

14. The method of claim 8, wherein the displayed particle entity size comprises a measurement of maximum feret diameter.

15. The method of claim 8, wherein the rubber sample comprises foam rubber and the filler particles comprise pores.

16. The method of claim 15, wherein the displayed particle entity size comprises a measurement of the pore area.

17. A computer macro for image analysis of the dispersion of filler particle entities in a rubber sample, comprising a series of computer commands including (i) a first group of commands that captures the image, (ii) a second group of commands that enhances the image, (iii) a third group of commands that distinguishes the filler particle entities from the rubber matrix, (iv) a fourth group of commands that defines each of the particle entities according to a computer-generated definition comprising pixels and grey scales and labels each of the particle entities falling within a minimum limit and a maximum limit for pixels and grey scales and, (v) a fifth group of commands that displays the computer-generated labels of the particle entities as a representation of the number of particle entities comprising each size of a plurality of particle entity sizes to provide a measurement of the dispersion of the filler particle entities in the rubber sample.

* * * * *